US007958185B2

(12) United States Patent
Rothermel

(10) Patent No.: US 7,958,185 B2
(45) Date of Patent: Jun. 7, 2011

(54) SPATIAL DATA ENABLED ENGINEERING, CONSTRUCTION, AND OPERATIONS COMPUTER-AIDED DESIGN (CAD) PROJECT SYSTEM, METHOD AND COMPUTER PROGRAM PRODUCT

(75) Inventor: Todd Rothermel, Gilbertsville, PA (US)

(73) Assignee: Bentley Systems, Inc., Exton, PA (US)

( * ) Notice: Subject to any disclaimer, the term of this patent is extended or adjusted under 35 U.S.C. 154(b) by 2519 days.

(21) Appl. No.: 09/954,077

(22) Filed: Sep. 18, 2001

(65) Prior Publication Data

US 2002/0035451 A1 Mar. 21, 2002

Related U.S. Application Data

(60) Provisional application No. 60/233,168, filed on Sep. 18, 2000.

(51) Int. Cl.
*G06F 15/16* (2006.01)
(52) U.S. Cl. .................................. 709/203; 709/225
(58) Field of Classification Search .......... 709/217–219, 709/203–204, 223, 225
See application file for complete search history.

(56) References Cited

U.S. PATENT DOCUMENTS

| 5,220,657 | A | * | 6/1993 | Bly et al. ..................... 711/152 |
|---|---|---|---|---|
| 5,438,661 | A | * | 8/1995 | Ogawa ......................... 715/804 |
| 5,548,506 | A | * | 8/1996 | Srinivasan ....................... 705/8 |
| 5,892,909 | A | * | 4/1999 | Grasso et al. ................. 709/201 |
| 6,088,702 | A | * | 7/2000 | Plantz et al. ............. 707/103 R |
| 6,349,287 | B1 | * | 2/2002 | Hayashi ........................... 705/8 |
| 6,523,036 | B1 | * | 2/2003 | Hickman et al. ............... 707/10 |
| 6,633,890 | B1 | * | 10/2003 | Laverty et al. ................ 707/203 |
| 6,640,238 | B1 | * | 10/2003 | Bowman-Amuah ......... 709/201 |
| 6,798,413 | B1 | * | 9/2004 | Tracey et al. ................ 345/440 |
| 6,801,949 | B1 | * | 10/2004 | Bruck et al. ................. 709/232 |
| 6,917,962 | B1 | * | 7/2005 | Cannata et al. .............. 709/204 |
| 6,918,082 | B1 | * | 7/2005 | Gross et al. .................. 715/511 |
| 2002/0035451 | A1 | * | 3/2002 | Rothermel ........................ 703/1 |

* cited by examiner

*Primary Examiner* — Faruk Hamza
(74) *Attorney, Agent, or Firm* — Venable LLP; Jeffri A. Kaminski

(57) ABSTRACT

A system and method of geo-spatially viewing project oriented data relating to engineering, construction, and operations (ECO) computer-aided design (CAD) services online using a browser-based viewer can include a three-tiered client/server architecture for accessing a database storing a plurality of files, each of which is stored as a series of components including spatial information. In an exemplary embodiment of the invention, a system, method and computer program product includes a browser-based project-oriented, collaboration system including a viewer operative to enable viewing of at least one of a business, a project, and a person, geospatially according to geospatial attributes associated with the business, project or person.

19 Claims, 10 Drawing Sheets

SPATIAL DATA ENABLED ENGINEERING, CONSTRUCTION, AND OPERATIONS COMPUTER-AIDED DESIGN (CAD) PROJECT SYSTEM, METHOD AND COMPUTER PROGRAM PRODUCT

CROSS-REFERENCE TO RELATED APPLICATIONS

This patent application is related to the following co-pending patent applications: (a) U.S. patent application Ser. No. 09/296,738, filed Apr. 22, 1999, for a "System for Collaborative Engineering Using Component and File-Oriented Tools"; (b) U.S. Ser. No. 09/586,786, filed Jun. 5, 2000, for a "System, Method and Computer Program Product for Generating a Viewable Computer Aided Design (CAD) Eplot"; (c) U.S. Ser. No. 09/586,786 filed Jun. 5, 2000, for a "System and Method to Maintain Real-Time Synchronization of Data In Different Formats"; (d) U.S. Ser. No. 09/586,7852, filed Jun. 5, 2000, for a "System and Method of Providing Engineering, Construction, and Operations Computer-Aided Design Services", and (e) U.S. Provisional patent application Ser. No. 60/233,168, filed Sep. 18, 2000, for a "Spatial Data Enabled Engineering, Construction, and Operations Computer Aided (CAD) Project System, Method and Computer Program Product" each of which is commonly assigned to the assignee of the present invention, and is incorporated herein by reference in its entirety.

BACKGROUND OF THE INVENTION

1. Field of the Invention

The present invention is directed generally to systems and methods related to computer-aided design (CAD) software, and more specifically to such systems and methods of providing engineering, construction, and operations CAD software application services over the Internet.

2. Related Art

CAD software is well known, and is used by architects, engineers, artists, and the like to create precision drawings and technical illustrations. CAD software is used to create two-dimensional (2-D) drawings and three-dimensional (3-D) models. Applications such as, e.g., MicroStation™ products, which are developed by Bentley Systems, Inc., Exton, Pa. U.S.A., and AutoCAD® products, which are developed by Autodesk, Inc., San Rafael, Calif., U.S.A., are typical of such CAD software, which may be used in the engineering, construction, and operations (ECO) marketplace. Also illustrative of the systems and methods used in the ECO marketplace are: U.S. Pat. No. 5,815,415 for a "Computer System for Portable Persistent Modeling"; U.S. Pat. No. 5,987,242 for an "Object-Oriented Computerized Modeling System"; and co-pending U.S. Ser. No. 09/296,738, filed Apr. 22, 1999, for a "System for Collaborative Engineering Using Component and File-Oriented Tools", each of which is commonly assigned to the assignee of the present invention, and is incorporated herein by reference.

Heretofore in the ECO marketplace, CAD software has most typically been used in one of two scenarios. Small- to medium-sized businesses, on the one hand, have deployed solutions such as AutoCAD in a standalone or networked environment. On the other hand, large, multinational businesses in the architectural, engineering, and construction (AEC) industries have deployed far-flung networks of robust solutions such as MicroStation. The relative costs of these solutions vary widely, depending in large part on the size and scalability of the projects in which they will be used. Nevertheless, the costs of these solutions represent but a small portion of the money spent in the ECO marketplace.

Every constructed asset has a life cycle of engineering, construction, and operations, which involves multiple disciplines (e.g., contractors, consultants, and subcontractors). Both unique in its design and uniquely located, each project typically requires a complex network of professionals and trades, which are themselves a unique gathering for each project. The supply chain for constructed assets is, therefore, enormous. As a result, managing that supply chain is an enormous task.

It has been found that as much as sixty percent of the nearly $3.6 trillion spent each year for construction goes to labor and not materials. Of course, the various trades account for most of this. However, it turns out that $30 billion is spent each year for design professionals to generate nearly eight million engineering drawings. An even greater amount of time and money is spent in finding and interpreting information embedded in those engineering drawings. Accordingly, it should be readily appreciated that engineering drawings are an essential technology of information integration in the ECO marketplace. It would be highly desirable, therefore, to provide CAD software for the ECO marketplace that reduces the time and money spent to generate engineering drawings, as well as finding and interpreting information embedded in those engineering drawings.

One approach that has been used in the past to simplify the processes of generating, finding, and interpreting engineering drawings has been to deploy CAD software over a project "extranet." Such project extranets help to automate the first (i.e., planning) stage of construction by removing inefficiencies of communications and coordination. Nevertheless, improvement of the first-stage design communications costs eventually reaches a point of diminishing returns.

It has been tempting in the past to suggest that the next step for improving management of construction projects would be to have everyone involved in a project concurrently online, in real time. However simple this suggestion might be, it ignores the real nature of the work being done. The many-varied workgroups in a design/construction value chain require absolute stability, with well-defined points of departure. For example, design, procurement, and installation of a typical heating, ventilation, and air conditioning system not only takes time, but also cooperation. "Long-transaction" commerce considerations come into play. Unfortunately, conventional asset engineering systems and methods have simply overlooked the need to provide essentials such as change merging, integrity checking, and versioning.

What has been lacking in most such systems and methods is "straight-through" processing. In straight-through processing, information captured at every step is encapsulated. Any element of information, once created, can be uniquely identified and re-used in subsequent transactions. With constructed-asset supply chains, however, attempts to use similar such processes have more often than not been thwarted by the opaqueness of monolithic CAD files, where the smallest negotiable unit of information is the drawing. Trained professionals can painstakingly interpret drawings, in their full context, but conventional systems and methods have been unable to penetrate conventional drawings and extract useful data. Moreover, the common practice in such systems is to transmit those drawings as raster files. It would be desirable, therefore, to provide a system and method which overcomes these obstacles.

Beyond the problems noted above, conventional systems also have suffered from two additional problems. Systems such as AutoCAD are relatively inexpensive. However, they are generally not sufficiently scalable to be used in large and complex projects, and regardless of their relatively low cost, inaccessible to many in the construction trades who are averse to computers. It would also be desirable, therefore, to provide CAD software which would not only be relatively inexpensive, but also scalable, robust, and easy-to-use.

A more recent attempt to achieve these goals has been the deployment of "project hosting" by application service providers (ASPs), such as ProjectPoint by buzzsaw.com. ASPs, in general, provide a contractual service offering to deploy, host, manage, and rent access to an application from a centrally managed facility. ASPs are responsible for either directly or indirectly providing all of the specific activities and expertise aimed at managing a specialized software application or set of applications. However, ASPs such as buzzsaw.com face a significant disadvantage. Their websites are most often run from a library of static pages, which are created in Hypertext Markup Language (HTML) under control of ActiveX™ (developed by Microsoft Corporation, Redmond, Wash. U.S.A).

HTML is perhaps the most portable of today's markup languages. It is supported by over 100 million Web browsers, and has become the de facto standard for transmitting information between people. HTML has many advantages, not the least of which is that HTML browsers are typically free. They are very powerful, have a combination of third-party add-ins and server-side content support, and a vast range of information is being delivered to HTML browsers. HTML document browser interfaces are easy to build into existing products because of the simplicity of HTML. HTML is easy to learn because it is very simple. There are only a couple dozen tags, but less than half of them are used in most situations. In working with HTML for just a few years, it has become very evident to users that the hypertext model really does work across systems that are otherwise unrelated. Any page can link to any other publicly accessible page simply by entering the address. There are some specialized structures in HTML, but the structures are mostly used to effect a certain formatting look. Because of the simplicity and low cost of HTML, a huge information base has been formed that makes HTML even more valuable.

HTML's simplicity, while making it valuable as a basic way of delivering simply structured information, causes it to fall short of being a long-term method of delivering complex information types. HTML is a very weak presentation tool that lacks even the most fundamental page-oriented formatting capabilities, such as, e.g., hanging indents, white-space control, justification, kerning, and hyphenation. HTML does not handle multiple-column snaking very well, either. However, because of the nearly universal compatibility, web site designers are getting around these problems by using tables to fake multiple columns and indents, GIF graphics to create certain designs with type and white space, and other such machinations. In such cases, HTML itself has simply become a shell that contains the real markup.

HTML is also a weak markup tool, because it does not allow for creating custom tags or presenting tags with different styles. There is no real modularity or hierarchical relationships between elements. This limits HTML to delivering page-oriented information instead of being a method to deliver intelligent information. HTML provides linking capabilities, but the linking is rudimentary; it is only a one-to-one link, and requires an anchor on the target end in order to access anything within the document. This is fine for most purposes, but such simple linking capabilities will limit HTML's long-term viability.

Another major problem with HTML is its instability. First, there was HTML, then HTML+, then HTML 2, then a series of decimal-point specifications in the threes, and now a level-4 HTML. Browser manufacturers have also created extensions to the "standard" HTML, like the "blink" and "center" tags. This has caused other browser manufacturers to play "catch-up". The combination of this instability and HTML's simplicity has caused a situation where there are numerous codes that break when presented in a browser. The presence of "Best Viewed with Microsoft Internet Explorer", or "Optimized for Netscape" banners attests to the fact that a page has been crafted to work best with a particular browser, at the expense of all of the others.

This balkanization of HTML has made webmasters and users frustrated and looking for a better solution. One way the HTML keepers are trying to extend HTML is by providing the ability to create more customized styles, while keeping the same markup. This is being done by cascading style sheets (CSS), which is a technical recommendation by the W3C (World Wide Web Consortium). CSS separates structure (i.e., HTML markup) from format (i.e., how it looks). While this is a good step, users are still stuck with the basic HTML tag set.

HTML's predecessor, the Standard Generalized Markup Language (SGML), is an international standard that is more than ten years old. It was originally designed to provide a way of describing text-based information so organizations could interchange information easily. Since then, SGML has become valuable in describing information sets so companies can get beyond the restrictions of paper-only publishing. SGML provides a way of creating markup languages customized for each document type, and separating the content from eventual formatting.

SGML is not tied to a particular operating system or application, and so it is portable from platform to platform. It is a standard maintained by the International Standards Organization (ISO). This means that it is very stable and while there are provisions for updating and changing ISO standards, the organization makes it very difficult to do so. This has turned out to be a real advantage, since it provides companies with a known syntax.

Because of the standing of SGML as a stable standard, there are many products available in every category, from editors to document management solutions, to typesetting and web delivery applications. Many vendors are providing tools and support in each category. These products range in price from free to very expensive. Since SGML is platform independent, these tools can be mixed and matched as desired, relieving companies of the risk of having their information locked into one vendor's product. SGML does not provide a fixed set of tags, but, rather, a syntax for creating your own tags. Many industries have formed consortia for the purpose of creating common tag sets to interchange information using their terms and expressions.

Notwithstanding its many advantages, SGML is complicated to understand and difficult to integrate into an application. SGML requires a "parser", which is difficult to write and maintain. Since SGML was created in the early days of desktop computers, it is overly concerned with maximizing limited memory and disk space by providing a complex set of "minimization" rules and exceptions. This complexity results in SGML being more expensive than a simple tag set like HTML. Each document must have a "document type definition" created, which requires the owner of the document to perform a "document analysis" to discover its structure. Also, because of the complexity of the standard, and the smaller market for vendors, tools that support SGML are more expensive than those that support HTML.

Another document format, the "portable document format" (PDF), was developed by Adobe Systems Inc., in order to provide a system-independent way of delivering page-based information. PDF files are created by printing to a PDF driver or by so-called "distilling" a PostScript file. The resulting PDF file can be read using a tool from Adobe called "Acrobat Reader," which is freely available on most popular systems in use today.

PDF provides electronic pages with impressive page fidelity. Type, graphics, and color are all reproduced as they are on paper. Even hot links and other electronic object types, like movies and sounds, can be added to a PDF file. PDF files are inexpensive to create, and are used by many companies to deliver page-formatted information without the high cost of postage. Since the end user gets something that looks very much like paper, training costs are low.

However, PDF creates large files with little structural information. PDF files are not nearly as flexible as other electronic formats because the main goal is to recreate a paper page, and not to provide a way of delivering intelligent document structure to a user. There is also little support for searching, although Adobe has other products that can index many different PDF files for cross-document searching and navigating (i.e., "turning" pages, "flipping" from section to section, and "scanning" the page for text of interest). Other than this limited support, navigation is limited. Another problem is page fidelity. PDF pages are not necessarily pixel-by-pixel replicas of a page that might be printed by the owner of the document. This is partly due to the fact that the fonts which are used to create the document originally might not be on the machine that eventually views the document. It was found desirable, therefore, to come up with a solution having the low cost and simplicity of HTML, the power and flexibility of SGML, and the pleasing formatting capabilities of PDF. Proponents of the "Extensible Markup Language" or XML, believe that standard fits the bill.

Just as in HTML, XML makes use of "tags" (i.e., words bracketed by "<" and ">") and attributes (of the form, e.g., name="value"). However, while HTML specifies what each tag and attribute means, and often how the text between them will look in a browser, XML uses the tags only to delimit pieces of data, and leaves the interpretation of the data completely to the application that reads it. In other words, if one sees "<p>" in an XML file, one should not assume it to be a paragraph. Depending on the context, it may be a price, a parameter, a person, etc. One distinct advantage of XML, furthermore, is its extensibility. For example, industry organizations such as the International Alliance for Interoperability have promoted such standards as aecXML™ (a trademark of the aecXML Domain).

aecXML is a framework for using the XML standard for electronic communications in the architectural, engineering and construction (aec) industries. It includes an XML schema to describe information specific to the information exchanges between participants involved in designing, constructing and operating buildings, plants, infrastructure and facilities. Various software applications used by aecXML participants can transfer messages formatted according to the aecXML schema to coordinate and synchronize related project information. Additionally, its specification facilitates e-commerce between suppliers and purchasers of equipment, materials, supplies, parts and services based on that same technical information. It would also be desirable, therefore, to provide CAD software usable over the Internet by way of dynamically rendered web pages using an extensible markup language, such as XML.

Another significant drawback to project hosting websites such as Project Point is that they are limited to proprietary drawing file formats created by AutoCAD (e.g., the DWG and DWF file formats). As a result, all of the users accessing such websites must run AutoCAD, or they will not be able to participate in the project. It would, therefore, be desirable to provide CAD software for an Internet environment, which is flexible and adapted to multiple drawing file formats. DWF files, for example, suffer from the disadvantage that they remove the nonvisual components of a drawing, such as attributes, properties, and complex object behavior. Moreover, the DWG format is an electronic plot that is view only, so that no matter how many people access the document, the integrity of the design is preserved. DWF files support hyperlinks, and such hyperlinks are usually not limited to data files. They can also activate Java applications, scripts, or other DWF files.

Most of the software that is used in engineering workflows today, including MicroStation and AutoCAD, generate project information in the form of files. The data contained in these files is very important to the engineering enterprise. Accordingly, efficient management and maintenance of such data has become of paramount concern. Most of the CAD applications in use today, as well as the operating systems that run them, allow only single-user access to each file. As a result, there is contention for write access which has greatly influenced today's engineering workflows. Certain data management tools are available, but the granularity of the data still remains at the file level. It would be highly desirable, therefore, to provide a system that would allow engineering project data to be stored and managed at the component level to open up a number of workflow improvements.

Component-level information management enhances the granularity of project data from files to components. Drawing files, such as DWG files and DGN files can be stored as a series of components. As a result, project data is available at a more granular level. Such component-based organization, thus, makes it possible to access information on a per-file basis, but manage change on a per-component basis. In short, that means that more than one person can edit a file at the same time. The MicroStation concept of reference files can, therefore, be extended into "shared" files where all users can edit project data at any time.

Component-level information management journals project changes and provide a reliable project history. When a set of components is changed in a MicroStation editing session, it is called a transaction. This transaction becomes a necessary process in managing DGN data at a component level. The transaction management process provides a "journal" of changes to the components. By "looking back" through the journal, users can access project data as it existed at previous stages of development. This concept of a complete project history, thus, becomes a valuable tool for project managers to understand how, when, by whom and why decisions were made, and if needed, reverse them.

Component-level information management leads to better coordination of hybrid projects. That is, the concepts of component-level information management apply not only to MicroStation, but also to other types of engineering files (e.g., those created by AutoCAD. AutoCAD-specific workflows will, thus, gain the same benefits of simultaneous write access and project history as do MicroStation workflows. In addition, since many engineering projects involve hybrid data sources, and an amalgamation of both AutoCAD DWG and MicroStation DGN files in the same project, the concepts of component-level information management will allow these hybrid file formats (and, in turn, hybrid workflows) to come together in one efficient and coordinated environment.

Conventional project oriented CAD systems and methods only provide textual based information regarding projects, people and businesses. Such textual information is difficult to analyze. It is desirable that a more user-friendly, graphical display means be used to convey the project-oriented data information. For example, conventional CAD systems lack geospatial visualization tools or geographic information system (GIS) viewing functionality.

A GIS combines layers of information about a geographic location to provide an analyst a better understanding of that place. What layers of information are combined depends on the GIS analyst's purpose, such as, e.g., finding the best location for a new store, analyzing environmental damage, viewing similar crimes in a city to detect a pattern, and so on. A GIS can include mapping software that links information about where physical things are with information about what the physical things are like. Unlike with a paper map, where "what you see is what you get," a GIS map combines many layers of information.

A conventional paper map enables a user to view a pictorial representation of, e.g., cities, roads, mountains, rivers, railroads and political boundaries. For example, conventionally, cities can be represented by little dots or circles, a road by a black line, a mountain peak by a triangle, and a lake by a blue area.

Similarly to the conventional paper map, a digital map created by a GIS can have dots, or points, representing features on the map such as cities. Lines can also represent features such as roads. Small areas can similarly represent features such as lakes. A significant difference between the digital map and the conventional paper map is that the information used to generate the digital map comes from a computer database of information. The data is shown only if the user chooses to show it. The data can be selectively layered and viewed. The database can store, e.g., where the point is located, how long the road is, and even how many square miles a lake occupies.

Each piece of information in the map sits on a layer, and the users can turn on or turn off the layers according to their needs. One layer could be made up of all the roads in an area. Another could represent all the cities. Yet another could represent all the lakes in the same area.

Conventional GIS systems include, e.g., the ArcInfo family of products from Environmental Systems Research Institute (ESRI) of Redlands, Calif., and MapInfo available from MapInfo of Troy, N.Y. Unfortunately, conventional GIS systems are standalone database systems. Conventional GIS systems run on a standalone workstation. Unfortunately, conventional GIS systems do not include web-based collaboration systems and methods.

Conventional browser-based project oriented collaboration systems do not include any geospatial analysis functionality or viewing capabilities. Instead these browser-based collaboration systems only provide for viewing of project information in a textual form. What is needed then is an improved browser-based project oriented collaboration system and method that overcomes the shortcomings of conventional systems.

SUMMARY OF THE INVENTION

Accordingly, a feature of the present invention provides improved systems, methods and computer program products relating to computer-aided design (CAD) software.

More specifically, the present invention features systems, methods and computer program products by which ECO CAD software application services may be efficiently provided over the Internet.

The apparatus, system, method, computer program product and article of manufacture described herein achieve the above and other features, and advantages according to the present invention, while avoiding the problems described herein above.

An exemplary embodiment of the present invention includes a browser-based, geospatial viewer of information relating to a project-oriented ECO CAD collaboration system.

Advantageously, the viewer of the present invention can provide a geospatial visualization of project collaboration datasets by spatially enabling the project collaboration datasets, by adding a spatial reference to the project collaboration datasets, and by enabling browser-based viewing of the project-oriented collaboration system data via a map.

In an exemplary embodiment, a user can select a subset list of project-oriented collaboration information, from a set list of project-oriented collaboration information, where spatial information has been associated with the project-oriented collaboration information; the user can then request a geospatially mapped view of the selected subset list of project-oriented collaboration information; and a map can be generated enabling viewing of the geospatially mapped view of the project-oriented collaboration information.

In an exemplary embodiment, the project-oriented collaboration information can include information such as, e.g., projects, businesses, documents, tasks and people.

In an exemplary embodiment, the spatial information can include, e.g., a zip code; a user-selected region; an area code; a geographic region such as, e.g., a country, city, state, county, village, town and borough; a non-geographic region; a political boundary; and a geographic location such as, e.g., a 2-dimensional location, and a 3-dimensional location.

Advantageously, by providing a visual representation of project-oriented data to users, the present invention's user friendly, intuitive, easy-to-use, point-and-click techniques can be employed for faster data mining and results.

Also advantageously, the present invention is designed to allow objects such as, for example, businesses, projects, documents, tasks, and people, to store geospatial location information and to modify settings in the project-oriented collaboration system database. The new functionality can allow users to "spatialize," or to provide a geolocation for the objects. For example, users can perform searches or queries on their project data such as, e.g., "show me all projects within 200 miles of this point," or "where is my project manager in relation to his staff" or "show me all current projects on a world map."

Advantageously, if a project leader wants to set up an "all hands" meeting during a project and wants to see where all the people involved in a project are located throughout the U.S., the present invention can graphically represent the locations of the team members enabling the project leader to determine a good meeting place. The project leader would first click the mapping icon, and a map would pop up with the selected people indicated on the map with pushpin icons. The pushpins are linked back to the collaboration system for easy transition to the object pages. Users can also then refine a query to include all people in a project who are within 200 miles of a ZIP code, to set up a separate meeting with them.

According to the present invention, users can visualize project collaboration information in ways never before possible through a simple point-and-click interface. Rather than having to go into Business Space of the collaboration system, for example, and clicking on each object individually to see where each is located, instead users can click advantageously the mapping icon and get a quick snapshot of all people or projects within a certain geographical area.

In an exemplary embodiment of the present invention, a Java viewer including a pure Java viewing application, is tied to the project-oriented collaboration system such as, e.g., Bentley's Viecon, to access live geospatial data. The Java viewer allows users to display and manipulate data quickly and easily.

Other features and advantages, as well as their structure and operation will become apparent from the following detailed description and accompanying drawings.

BRIEF DESCRIPTION OF THE DRAWINGS

The foregoing and other features and advantages of the invention will be apparent from the following, more particular description of an exemplary embodiment of the invention, as illustrated in the accompanying drawings.

DETAILED DESCRIPTION OF THE INVENTION

Figure 1A:
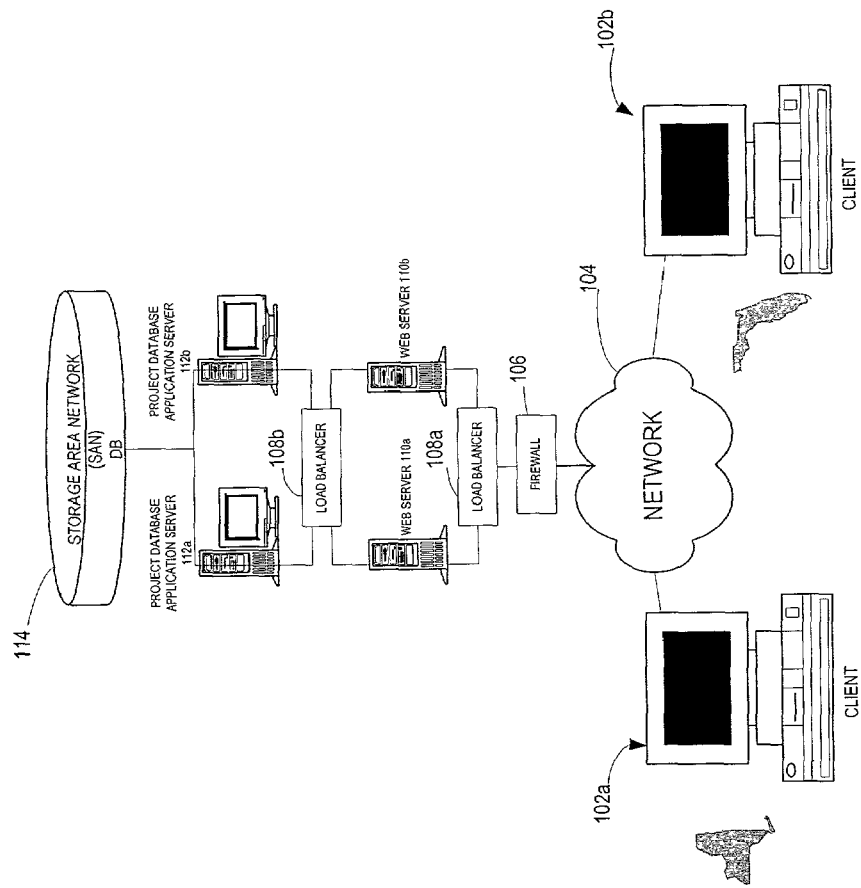
FIG. 1A depicts a block diagram of high level Internet-based project-oriented computer aided design (CAD) collaboration system environment of an exemplary embodiment of the present invention.

A preferred embodiment of the invention is discussed in detail below with reference to accompanying drawings. While specific implementations are discussed, it should be understood that this is done so for illustration purposes only. A person skilled in the relevant art will recognize that other components and configurations may be used without parting from the spirit and scope of the invention. In the drawings, like reference numbers generally indicate identical, functionally similar, and/or structurally similar elements. The drawing in which an element first appears is indicated by the leftmost digits in the corresponding reference number.

FIG. 1A depicts a block diagram 100 illustrating a high level Internet-based project-oriented computer aided design (CAD) collaboration system environment of an exemplary embodiment of the present invention. Block diagram 100 is adapted to be accessed by a plurality of clients 102a and 102b, collectively 102. Such clients 102, in turn, suitably comprise one or more conventional personal computers, workstations, or other end user devices operating as a "fat" or a "thin" client. It should be understood, nevertheless, that other clients 102 such as Web-enabled hand-held devices such as, e.g., a Palm V™ organizer manufactured by Palm, Inc., Santa Clara, Calif. U.S.A., Windows CE devices, pagers, and "smart" phones, which can use a wireless access protocol; and Internet appliances, also fall within the spirit and scope of the present invention.

Clients 102 of all of the above types can suitably access system 100 by way of a network 104 such as, e.g., the global Internet. By use of the term "Internet," it should be understood that the foregoing is not intended to limit the present invention to a network also known as the World Wide Web. It includes corporate networks, private networks, public networks, intranets, extranets, Virtual Private Networks (VPNs), and the like. In any case, a pair of Internet access lines such as, e.g., primary and secondary conventional T3 lines can be cross-connected from the Internet or network 104 backbone to one or more, and preferably, a pair of redundant routers (not shown). Incoming traffic from a first of such routers can then be suitably directed through, e.g., a firewall 106 to a second of such routers. Even more preferably, and for the sake of redundancy, two firewalls 106 could be cross-connected (not shown). An exemplary router is the SmartSwitch Router 8000, available from Enterasys Networks division of Cabletron Systems of Andover, Mass. U.S.A. Moreover, an exemplary implementation embodiment can include a firewall 106 such as an IP network application platform such as, e.g., the IP650, IP440, or IP330 firewall platforms, available from Nokia Group of Espoo, Finland.

Block diagram 100, in an exemplary embodiment can include a plurality of redundant web servers 110a and 110b, collectively 110. Web servers 110 can be conveniently load balanced by use of the foregoing configuration. That is, the load of incoming traffic from the network 104, through the routers and firewalls 106, can be balanced among each of the web servers 110a, 110b via, e.g., a load balancer 108a. Load balancing can be performed using any of various methods such that: (1) certain incoming traffic can be routed to a particular web server 110a, 110b where that particular web server 110a, 110b had been recently used by a given user whose information had been cached on that particular web server 110a, 110b and, as a result, it would be more efficient to continue to use that particular web server 110a, 110b; or (2) no single one of the web servers 110a, 110b can become overburdened.

In an exemplary embodiment of the present invention, there can be, e.g., three such web servers 110a, 110b. Each of web servers 110a, 110b in an exemplary embodiment, in turn, can preferably include a Dell™ PowerEdge™ 2450 server (available from Dell Computer Corporation of Austin, Tex. U.S.A.), configured, e.g., with a 733 MHz Pentium III processor, 256 MB RAM, and dual, mirrored 9.1 GB fixed disk drives. Preferably, each of the web servers 110a, 110b can further include a Microsoft® Windows® NT operating system available from Microsoft Corporation of Redmond, Wash., U.S.A., and Netscape Enterprise Server, Release 3.6.3 (developed by Netscape Communications, a subsidiary of America Online, Inc., Dulles, Va. U.S.A.). Optionally, Netscape's Certificate Server can also be installed on each of the web servers 110a, 110b to facilitate core digital certificate-issuance and management services, as well as distribution of certificates and certificate-revocation lists to clients and other servers. Other forms of certificate servers (e.g., web certificate servers and wireless certificate servers, such as, e.g., those available from VeriSign, Inc., of Mountain View, Calif. U.S.A.) can likewise be deployed on each of the web servers 110a, 110b.

Block diagram 100 can further include a plurality of application servers 112a, 112b, coupled to the web servers 110a, 110b. In an exemplary embodiment, a load balancer 108b is shown balancing workload across application servers 112a, 112b. In an exemplary embodiment of the present invention, there can be six such application servers. Each of the application servers 112a, 112b, like the web servers 110a, 110b, in an exemplary embodiment, can include a Dell PowerEdge 2450 server, configured with a 733 MHz Pentium III processor, 256 MB RAM, and dual, mirrored 9.1 GB fixed disk drives. In an exemplary embodiment, each of the application servers 112a, 112b can further include a Microsoft Windows NT operating system, and a Total-e-Business™ platform, developed by Bluestone Software, Inc., Philadelphia, Pa. U.S.A., and including the Total-e-Business Server (formerly known as "Sapphire/Web"). Bluestone's Universal Business™ Server, Release 7.0, for example, can, in an exemplary implementation embodiment, be used to manage the ECO CAD system and methods of the present invention, while running on each of the application servers 112a, 112b. In an exemplary embodiment, load balancers 108a, 108b can include Bluestone's Load Balance Broker (LBB) loaded on each of the web servers 110a, 110b, to facilitate balancing of the load of communications between each of the web servers 110a, 110b and each of the application servers 112a, 112b.

When a request within the ECO CAD application is intended for one of the application servers 112a, 112b, the request can go to one of potentially many instances of the application, which can reside on different machines. The task of ensuring that simultaneous requests are distributed evenly across multiple instances, in order to ensure efficient processing, falls to the LBB.

Coupled to the layer of web servers 110a, 110b and application servers 112a, 112b can be a storage area network (SAN) 114. SAN 114, in an exemplary embodiment, can generally include a cluster server (i.e., not shown) coupled to receive incoming Internet traffic through each of the application servers 112a, 112b, and to transmit outgoing Internet traffic through the routers and firewalls 106, from the SAN 114 by way of either a file server or a database server (i.e., not shown). The file server and database server can each preferably include, in an exemplary embodiment, a Sun Enterprise™ 420R server (available from Sun Microsystems, Inc. of Palo Alto, Calif. U.S.A.). In the case of the former, the file server can further include, e.g., a pair of 450 MHz UltraSPARC-II processors with 2 GB ECC memory. The latter database server, on the other hand, can further include, e.g., four 450 MHz UltraSPARC-II processors with 4 GB ECC memory. Accordingly, both the file server and database server can preferably run in a Solaris™ operating environment. The database server can also preferably include a database management system (DBMS) such as, e.g., Oracle 8i™, Release 2.

In an exemplary embodiment of the present invention, SAN 108 can include, e.g., a fibre channel switched network or fabric. Such networks can provide a high-performance, any-to-any interconnect for server-to-server or server-to-storage traffic. Fibre channel switched networks can combine the characteristics of traditional networks (e.g., large address space, scalability) and input/output (I/O) channels (e.g., high speed, low latency, hardware error detection) on a single infrastructure. Additionally, fibre channel switched networks can facilitate multiple protocols for networking (e.g., IP), storage (e.g., SCSI) and messaging (e.g., VIA) over a single infrastructure. This infrastructure can easily be used to create SAN 108, in which peripheral devices such as disk storage and tape libraries (i.e., not shown) can be attached to the network and shared among attached nodes. Some of the desirable features of this manner of organizing the servers and storage of the invention described herein follow.

Fibre channel fabrics such as SAN 114 can provide a switched 100 Mbytes/second full duplex interconnect. In addition, block-level I/O can be handled with remarkable efficiency compared to networking traffic. A single SCSI command can transfer many megabytes of data with very little protocol overhead, including CPU interrupts. As a result, relatively inexpensive hosts and storage devices can achieve very good utilization and throughput on the network. SAN 114 can also use a 24-bit addressing scheme, thereby permitting 16 million devices to be addressed. SAN 114 can further include a pair of cross-connected SilkWorm™ fibre channel switches (available from Brocade Communications Systems, Inc. of San Jose, Calif. U.S.A.).

Traditional storage interconnects can be limited in the length of cable that can attach hosts and storage units. Fibre channel can allows links up to 10 kilometers, which can vastly increase the options for the server administrator. SAN 114 can allow a number of servers to use sections of SAN-attached storage devices. The SAN 114 can allow for cost efficiencies that come from purchasing storage in large units. In addition, this arrangement can make it possible to ensure consistent quality and support across the entire server population. Externalizing the storage from the server can make it a first class asset in its own right. Servers can be upgraded while leaving storage in place. Storage can be added at will and dynamically allocated to servers without downtime. Because the SAN 114 can be extensible, it can allow incremental deployment of features such as fault tolerance and hot backup sites.

In an exemplary embodiment, a cluster server can be included having a Veritas Cluster Server™ (available from Veritas Software Corporation, of Mountain View, Calif. U.S.A.). The file server and database server can be redundantly configured. That is, in the event that either of the servers goes down during a session, the other can assume control of that session with the assistance of the cluster server. VERITAS Database Edition™ for Oracle®/HA may, alternatively, be used. As a result, the database service can be composed of one or more logical network addresses (e.g., IP), RDBMS software, an underlying file system, a logical volume manager and a set of physical disks being managed by the volume manager. If this service, typically called a service group, needed to be migrated to another node for recovery purposes, all of its resources could migrate together to re-create the service on another node. A single large node can host any number of service groups, each providing a discrete service to networked clients who may or may not know that they physically reside on a single node.

Service groups can, thus, be managed to maintain service availability through an intelligent availability management tool. Given the ability to test a service group to ensure that it is providing the expected service to networked clients and an ability to automatically start and stop it, such a service group can be made highly available. If multiple service groups are running on a single node, then they must be monitored and managed independently. Independent management allows a service group to be automatically recovered or manually idled (e.g., for administrative or maintenance reasons) without necessarily impacting any of the other service groups running on a node.

Application servers 112a, 112b, in concert with the web servers 110a, 110b, file server, database server, and the clients 102, can provide a three-tiered architecture. As with similar such three-tiered architectures, application servers $107_1$ through $107_n$ handle most of the application processing, such as business logic processing and database integrity processing. The clients 102 can handle interface processing, while the file server and database server can handle database processing. The hardware included as part of the system of block diagram 100 can also include a high-availability storage cross-coupled to the file server and database server. One suitable such high-availability storage, in an exemplary embodiment, can include a fibre channel switch, a pair of disk controllers, and a pair of disk arrays. Each of the disk controllers can include, in an exemplary embodiment, a SCSI controller (e.g., a Symbios® SYM53C1010 Ultra160 SCSI controller, available from LSI Logic Corporation of Milpitas, Calif. U.S.A.). In an exemplary embodiment, the disk arrays can include twenty 36 GB LVD (i.e., low voltage differential) disk drives which are configured to be mirrored using, e.g., RAID 0, RAID 1, or RAID 5. Suitable such LVD drives include, for example, the Ultrastar 36ZX hard disk drives available from IBM Corporation of Armonk, N.Y. U.S.A.

The system of block diagram 100 can further include a tape library (i.e., not shown), which can include a plurality of advanced intelligent tape drives (such as, e.g., AIT2 tape drives) and a plurality of storage positions for the AIT2 tapes. In an exemplary embodiment, the tape library can include a TLS-4000 automated tape library (available from Qualstar Corporation of Canoga Park, Calif. U.S.A.), which can include up to 12 AIT2 tape drives and can include storage for at least 60 AIT2 tapes. Such a tape library, furthermore can include suitable software (such as, e.g., Veritas Netbackup™) to control reading and writing of data to the tape library.

Figure 1B:
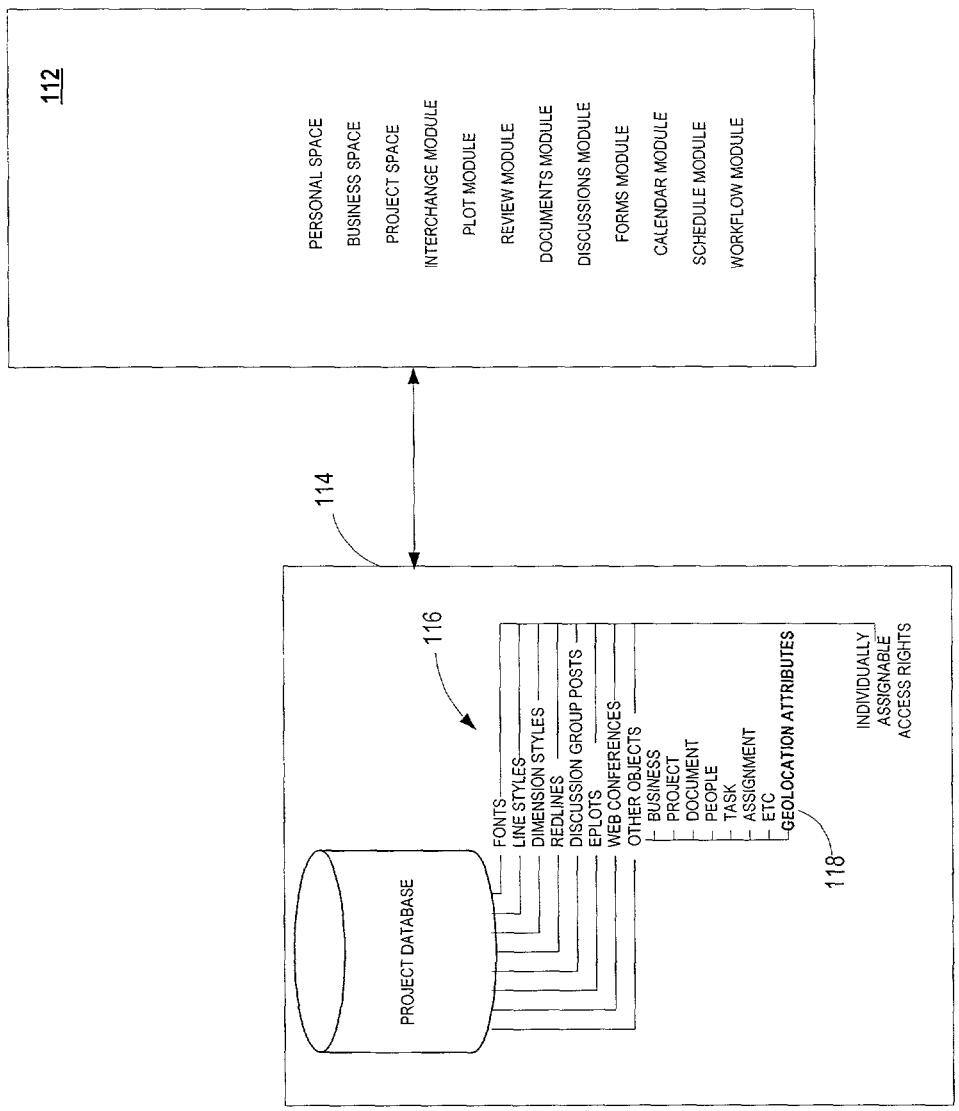
FIG. 1B depicts a more detailed block diagram of an exemplary embodiment of a project database of the project-oriented collaboration system of the present invention.

FIG. 1B depicts a more detailed block diagram of an exemplary embodiment of a project database of the project-oriented collaboration system of the present invention. FIG. 1B includes an application server 112, shown including a greatly simplified block diagram of an ECO CAD application for use with the system of block diagram 100 according to the present invention. The ECO CAD application generally can include a user interface, including, e.g., a "personal space" graphical user interface GUI, a "business space" GUI, a "project space" GUI, and three basic user modules. A plurality of additional component-based modules, including, e.g., a documents module, a discussions module, a forms module, a calendar module, a schedule module, and a workflow module, are used to provide such additional functionality.

FIG. 1B further includes the project database 114 coupled to application server 112 including various exemplary data components 116. Notably, according to the present invention, geolocation attributes 118 can be included and can be associated with any of the data component objects 116. For example, a business can include a geolocation attribute associated with, e.g., a headquarters location and any other business location. Also, various projects can be associated with geolocation attributes such as, e.g., a CAD project for a building could be associated with the geographic location of the building. Further, people who work collaboratively can chose locations with which to associate themselves such as, e.g., the locations, including city and state, for example, where the people work.

Figure 1C:
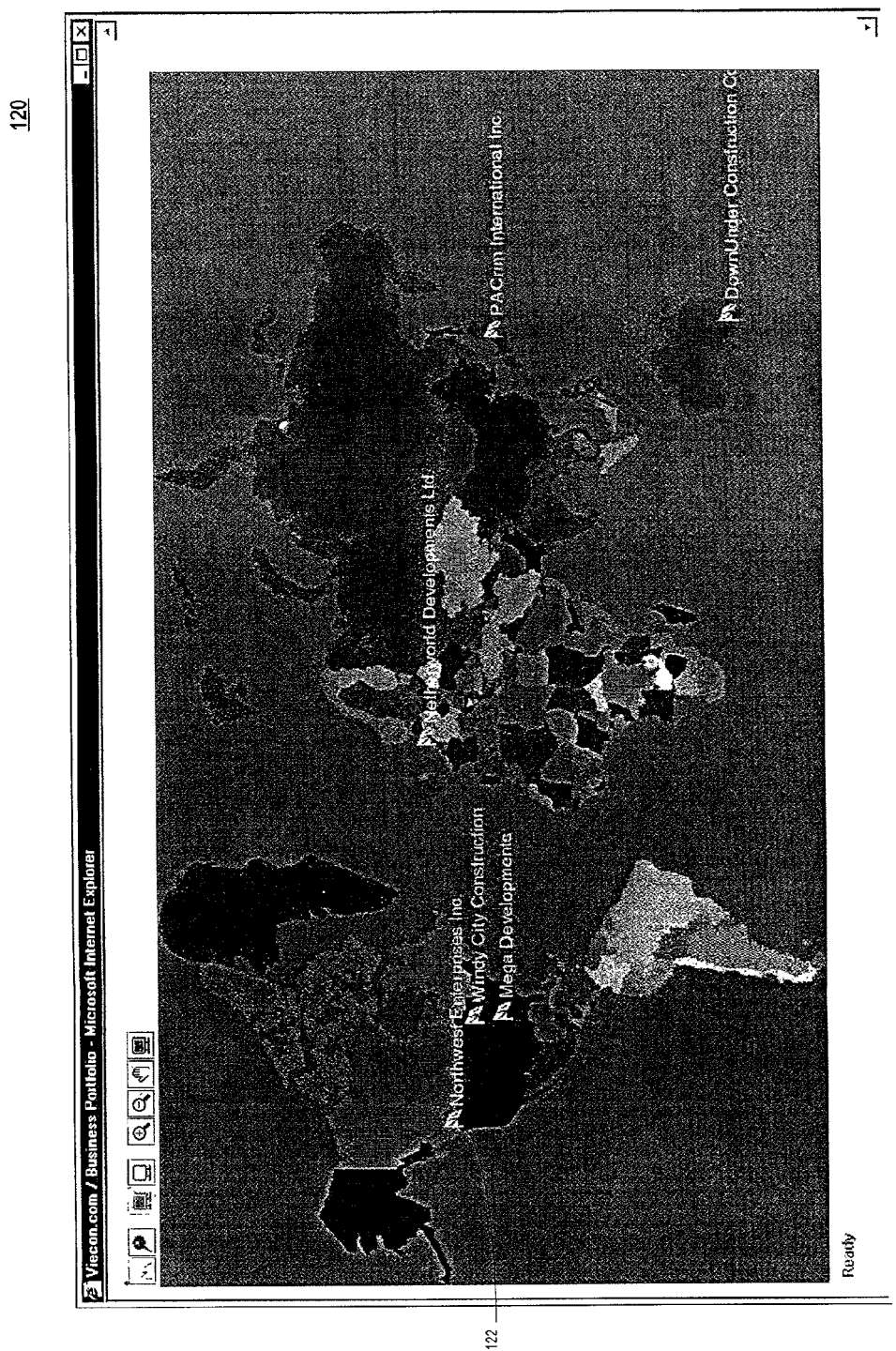
FIG. 1C depicts a graphical user interface (GUI) of an exemplary embodiment of a graphical user interface (GUI) of a global geospatial view of exemplary businesses of a project database of the present invention.

FIG. 1C depicts a graphical user interface (GUI) 120 of an exemplary embodiment of a graphical user interface (GUI) of a global geospatial view of exemplary businesses 122 of project database 114 of the present invention. In the map view of GUI 120, businesses have been selected for spatial visualization. Any businesses having geospatial attributes 118 such as, e.g., a zip code; a user-selected region; an area code; a geographic region such as, e.g., a country, city, state, county, village, town or borough; a non-geographic region; a political boundary; and a geographic location such as, e.g., a 2-dimensional location, or a 3-dimensional location.

Figure 2:
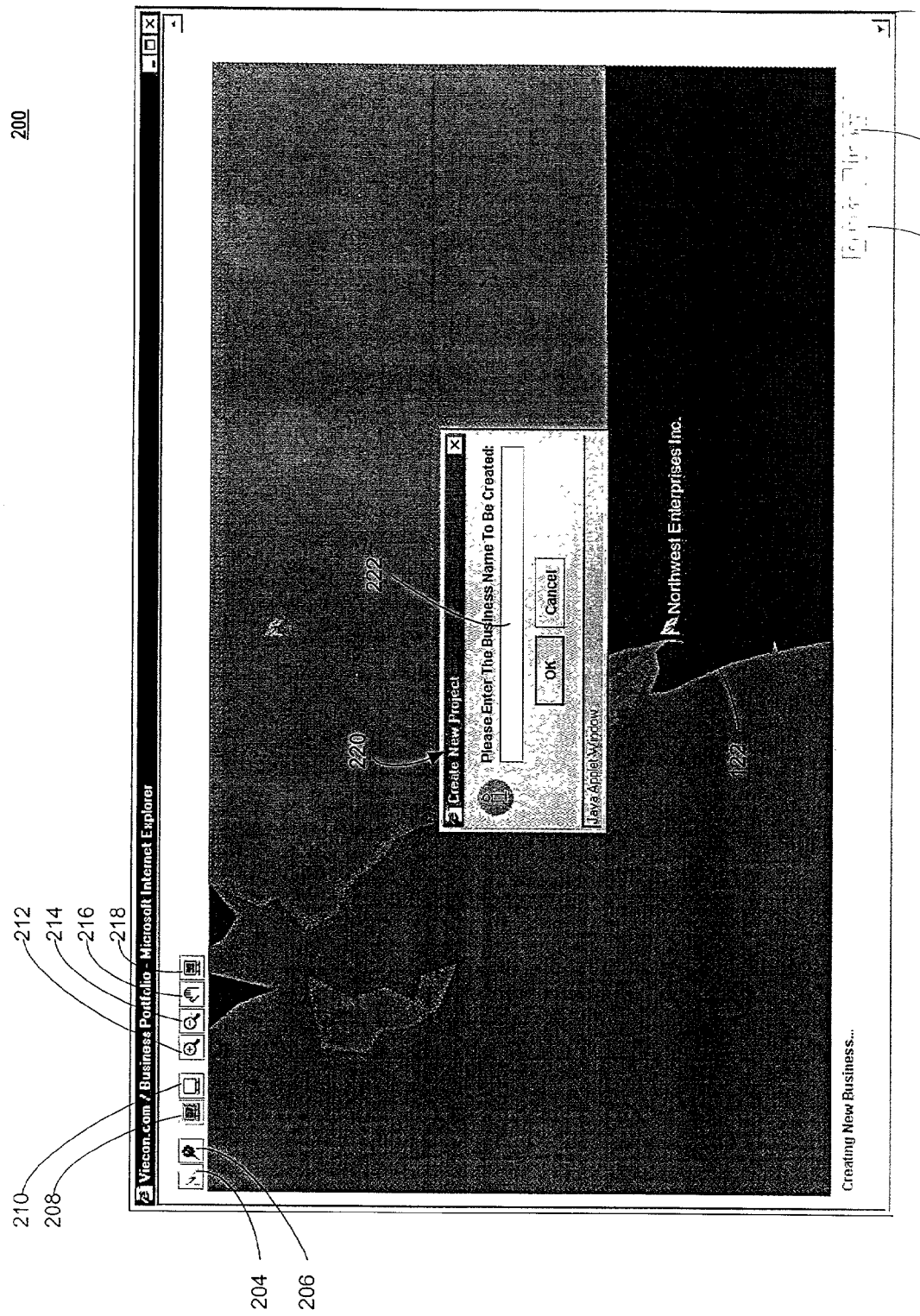
FIG. 2 depicts an exemplary embodiment of a GUI creating a new business according to the present invention.

FIG. 2 depicts an exemplary embodiment of a GUI 200 creating a new business according to the present invention. The geospatial viewer of GUI 200 includes various exemplary buttons 204, 206, 208, 210, 212, 214, 216 and 218, and geospatial location coordinates 224, 226. It will be apparent to those skilled in the art that additional buttons and/or coordinates can be included within the spirit and scope of the invention. The map includes business 122.

Button 204 can be used to create a new business. In the exemplary embodiment, a business can be represented by a flag icon. It will be apparent to those skilled in the art that any other symbol can also be used. Thus, to create a new business, the user can select button 204 with a mouse selection and then can select a location for the new business by clicking on the map at the location of the desired new business. The coordinates 224, 226 of the mouse click can be associated as a geospatial location attribute 118 of the new business data component. A create new business window 220 can be displayed including, as shown in the exemplary embodiment, a business name field 222 in which the user can enter the business name to be created.

Similarly, to create a new project, button 206 can be selected. In the exemplary embodiment, the new project button 206 can include a pushpin icon.

Other exemplary buttons can also be included such as, e.g., a fullscreen window button 210, and a restore window icon 208. A zoom in button 212 and a zoom out button 214, as shown, can also be included in an exemplary embodiment. A hand button 216 can be included to enable a user to "click and hold" a map and move the map by moving the mouse in a given direction. Other button 218 can be used to toggle back to a textual view of the project collaboration system, in an exemplary embodiment. Additional useful buttons such as, e.g., for printing, for marking a selection area, or otherwise can be included, as well as conventional pull-down menu item functions, as will be apparent to those skilled in the art.

Figure 3:
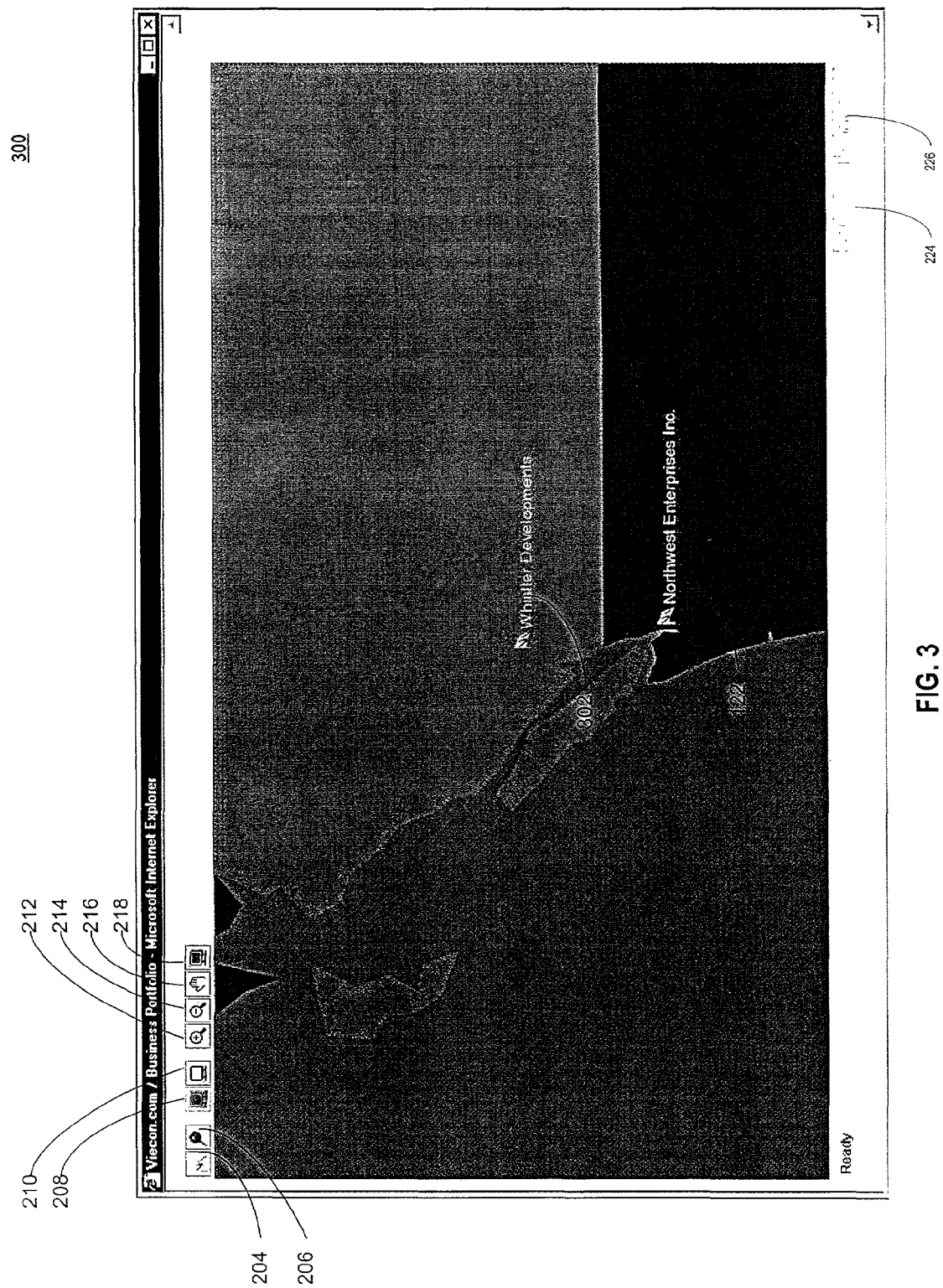
FIG. 3 depicts an exemplary embodiment of a GUI illustrating the newly created business of the present invention.

FIG. 3 depicts an exemplary embodiment of a GUI 300 illustrating the newly created business represented by flag 302 created using GUI 200 including entering "Whistler Developments" into field 222 of create new business window 220 of FIG. 2 of the present invention. Selection with a mouse click of button 218 can cause the GUI 400 of FIG. 4 to be displayed.

Figure 4:
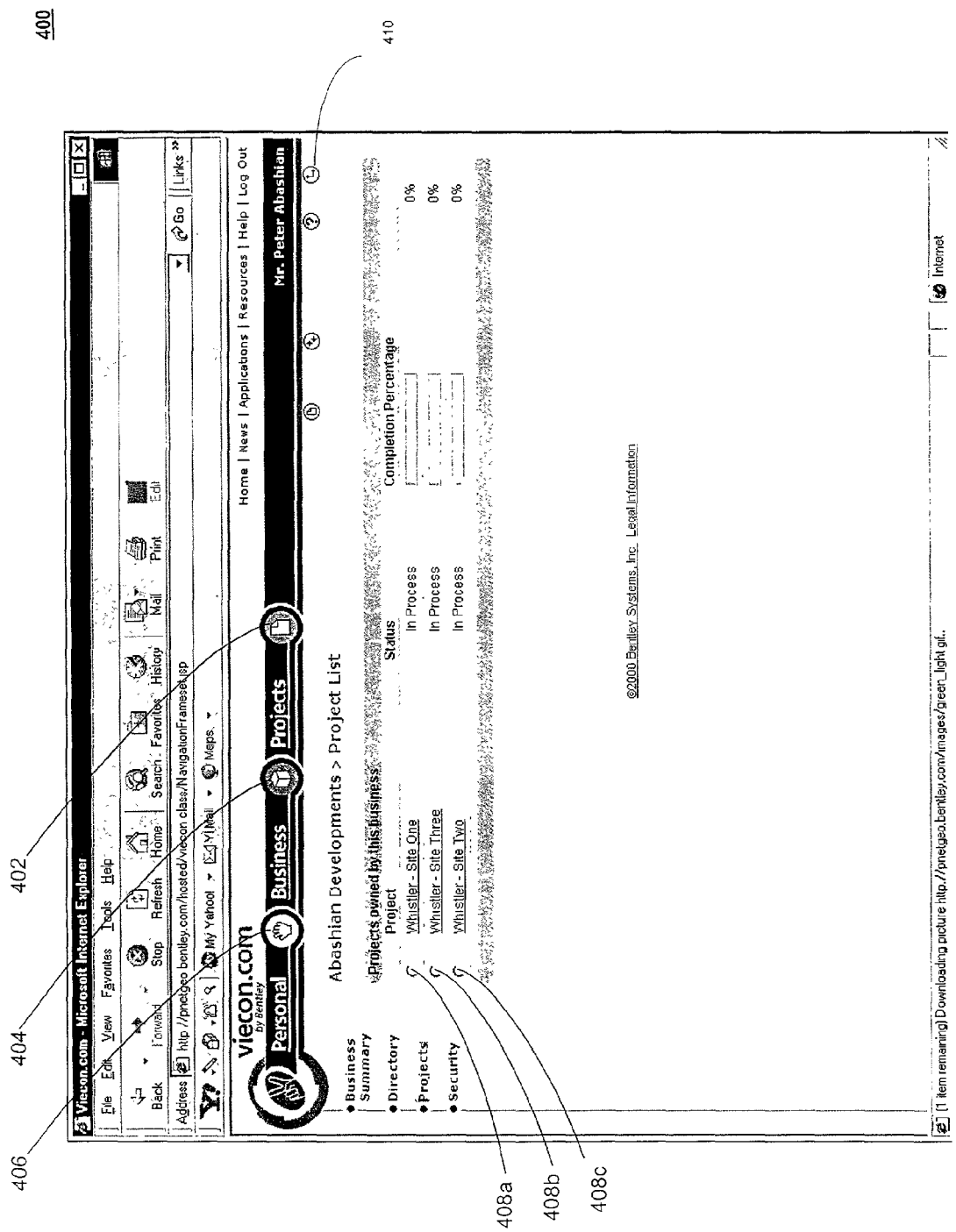
FIG. 4 depicts an exemplary embodiment of a GUI including various projects which can be associated with the newly created business according to the present invention.

FIG. 4 depicts an exemplary embodiment of a GUI 400 including various projects 408a, 408b, 408c. The projects 408a, 408b, 408c can be created using a button 206 of GUI 300. The projects 408a, 408b, 408c can be associated with the newly created business 302 according to the present invention. As shown, a user can view a project list by selecting button 402. To select another business, button 404 can be selected. To view a list of personal items, button 406 can be selected.

In an exemplary embodiment of the present invention, any of the projects 408a, 408b, and 408c can be selected by mouse selection of a radio button 408a-c. To geospatially view the projects, the user can select button 410 in an exemplary embodiment. To better view the location of the projects selected, (assuming geospatial location attributes are available for the projects), the user could also consider zooming in using button 212 of GUI 300.

Figure 5:
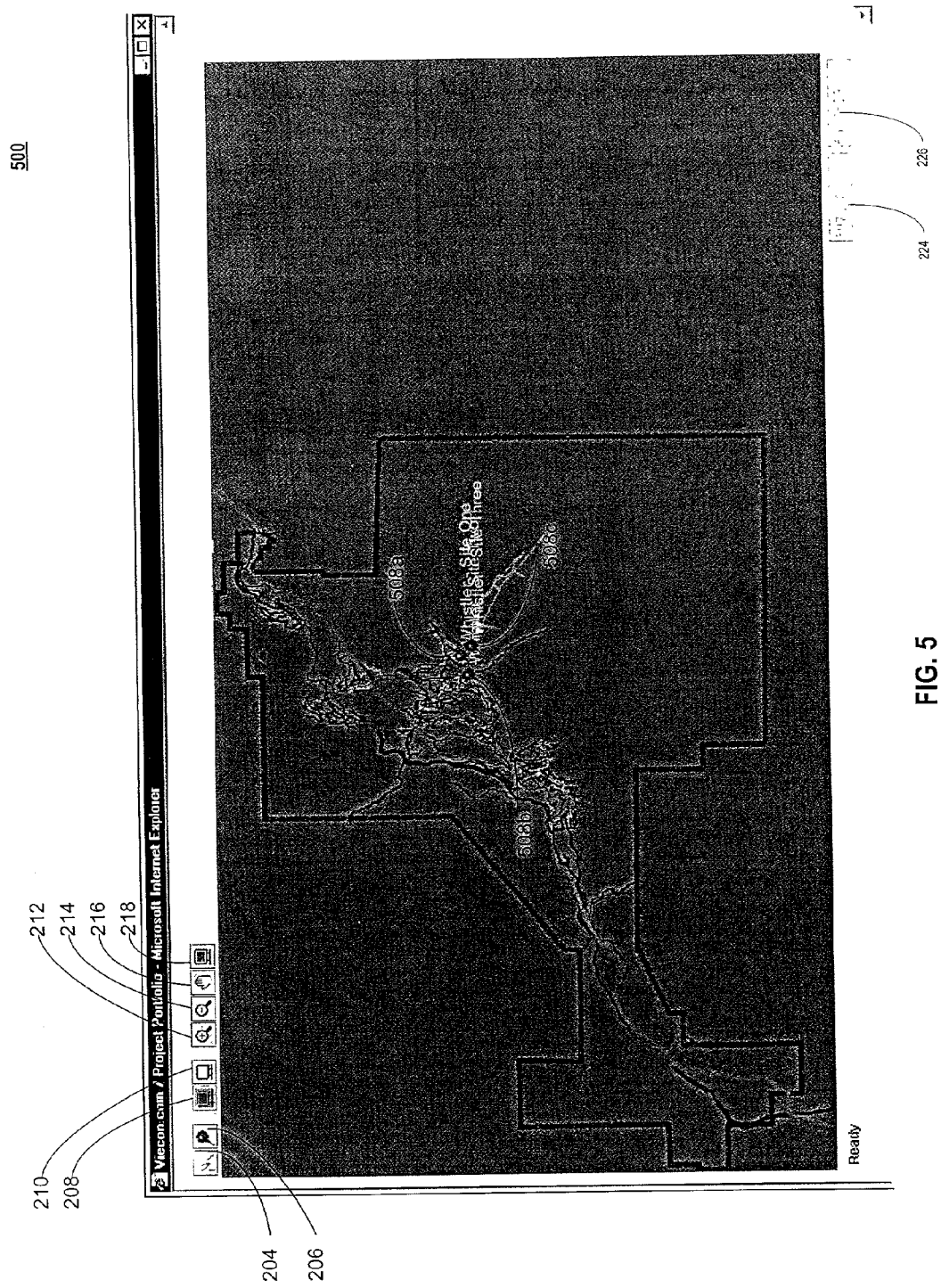
FIG. 5 depicts an exemplary embodiment of a GUI illustrating a geospatial view of various projects according to the present invention.

FIG. 5 depicts an exemplary embodiment of a GUI 500 illustrating a geospatial view of various projects 508a, 508b, and 508c according to the present invention. The geospatial location of the projects 508a, 508b, and 508c can always be changed by dragging and dropping the icons at a different location, in an exemplary embodiment of the present invention. In one exemplary embodiment, rights to change geospatial location of businesses and/or projects, etc. can be controlled, or reserved to an administrator, or other user with change privileges. Upon selection of a zoom in button 212, a zoomed-in representation can be displayed as shown in FIG. 6.

Figure 6:
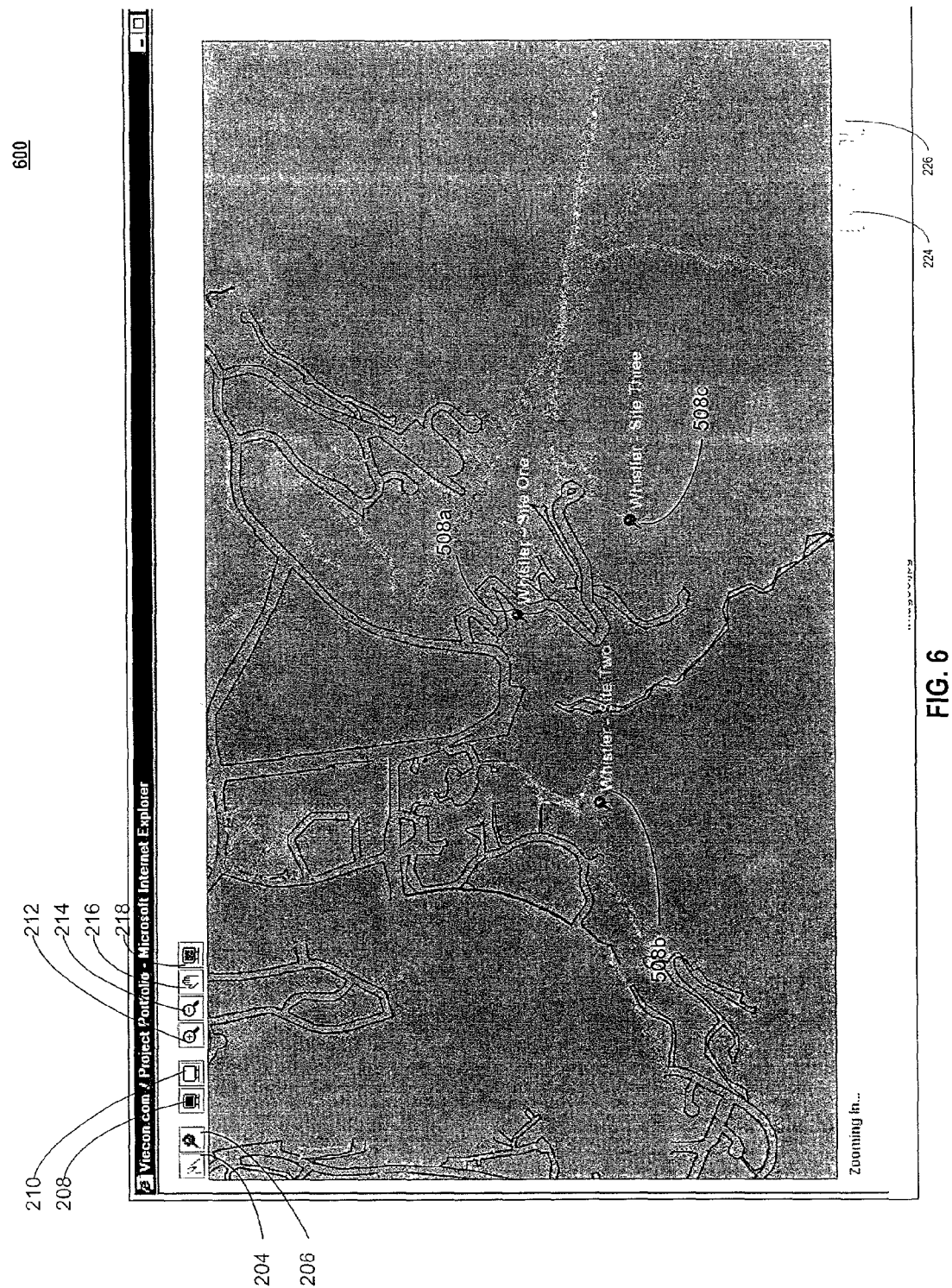
FIG. 6 depicts an exemplary embodiment of a GUI illustrating a zoomed-in view of various projects according to the present invention.

FIG. 6 depicts an exemplary embodiment of a GUI 600 illustrating a zoomed-in view of various projects 508a, 508b, and 508c, according to the present invention. Additional new projects can be added using new project pushpin button 206. To represent people, another button can be added for adding new people to a geospatial view.

Figure 7:
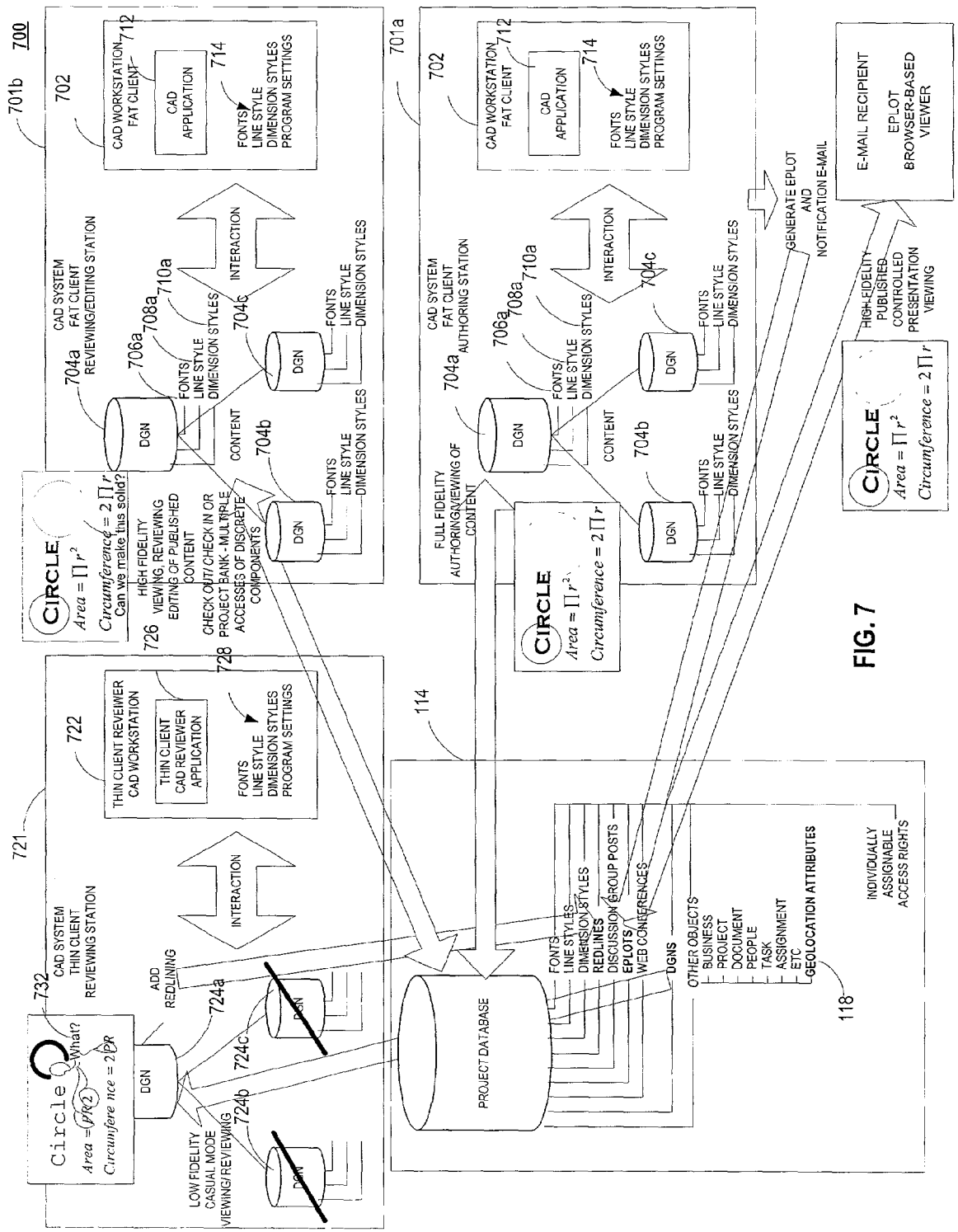
FIG. 7 depicts an exemplary embodiment of a block diagram illustrating interaction between the project-oriented collaboration system and other authoring, thin client reviewing, fat client reviewing/editing and browser-based viewing of the present invention.

FIG. 7 depicts an exemplary embodiment of a block diagram illustrating interaction between the project-oriented collaboration system including project database 114 and other authoring workstations 701a, thin client reviewing workstation 721, a fat client reviewing/editing workstation 701b, and a browser-based electronic plot (e-plot) viewing browser (not numbered) of the present invention.

Figure 8:
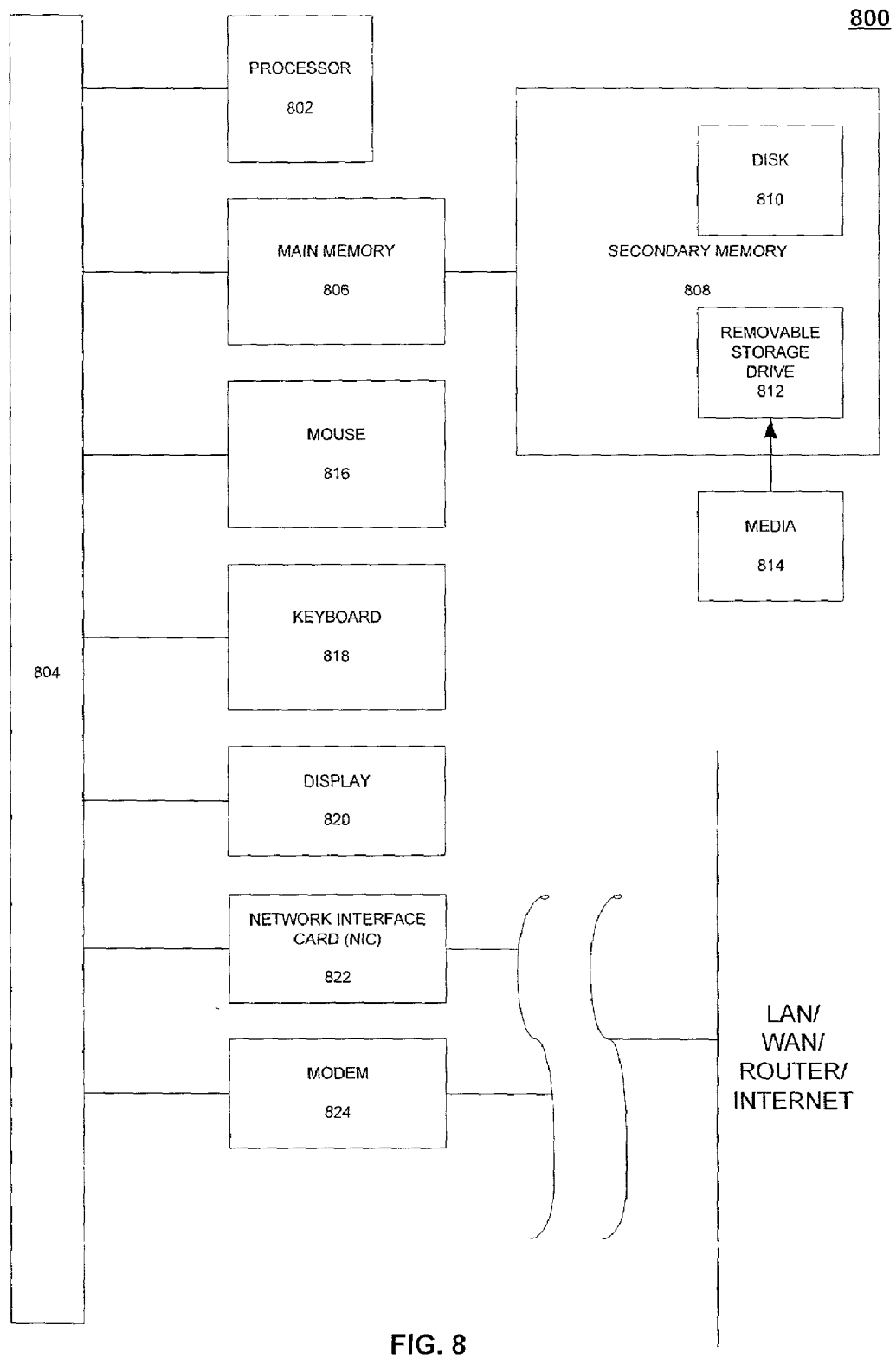
FIG. 8 depicts an exemplary embodiment of a block diagram illustrative of a computer according to the present invention.

FIG. 8 depicts an exemplary embodiment of a block diagram 800 illustrative of a computer according to the present invention. The computer of FIG. 8 is representative of a computer as could be used as a client computer 102a, 102b, web servers 110a, 110b, routers, firewalls 106, load balancers 108a, 108b, application servers 112a, 112b, and storage area network (SAN) 114. Computer 800 includes one or more processors 802 coupled to a bus 804. The bus 804 can be coupled to any of various subsystems including, e.g., as shown, a main memory 806, and a secondary memory 808 such as, e.g., a disk 810, and/or a removable storage drive 812 into which media 814 can be placed including, e.g., a diskette, a compact diskette, or the like; an input device such as, e.g., a mouse 816, or a keyboard 818; an output device such as, e.g., a display 820 or printer (not shown); and an input/output (I/O) device to network 104 such as, e.g., network interface card (NIC) 822 such as, e.g., an Ethernet, Token Ring, or Asynchronous Transfer Mode (ATM) card, or a modem 824, or other device such as, a wireless transceiver. It will be apparent to those skilled in the relevant art that the above described computer has been provided as an example and is not intended to limit the breadth of the invention in any way.

In an exemplary embodiment of the present invention, the geospatial enabled ECO CAD application according to an exemplary embodiment of the present invention can include, e.g., two separate computer programs: (1) a server program on a server side 112a of the application; and (2) a client program on a client 102 side of the application. The two programs can be loaded into memory and executed on a single computer; or they may be loaded on two different computers connected together by a computer network; or they may be combined into a single program. In an exemplary embodiment of the present invention, the geospatial project-oriented viewer is Internet enabled, or web-enabled, including a JAVA applet or pure JAVA viewer which can in one embodiment be browser-based. The spatially enabled project collaboration system of the present invention, can provide a backoffice tool set which can be used by a user to populate the project database with geospatial location attribute 118 information.

The server program, in an exemplary embodiment can be the central hub not only for controlling access to the project data, but also for coordinating and recording changes to that project data. It can execute, in an exemplary embodiment, on each of the plurality of application servers 112a, 112b shown in FIG. 1A. For any given ECO project, there is one particular server program that is available over the computer network. The server program can create, open, operate on, and maintain a component database (CDB), which can be associated with a project in the disk arrays of SAN 114 shown in FIG. 1. In an exemplary embodiment, the CDB can include a single file or a controlled collection of files that can contain various components that can be included in a current version of the project. However, a CDB can also be some other form of long-term storage facility (e.g., a structured store or a relational database). The server program can also create, open, operate on and maintain a history file, which can contain a list of all changes to components during the project. No other program or computer need directly access the CDB or the history file. Instead, users on individual client computers 102 of FIG. 1 can execute as follows.

Client programs can execute locally on an individual project participant's client computer 102. A client program can usually find the location and name of a server program through an external registry of such known servers, and can make a connection using standard network socket techniques. The registry can preferably be a simple text-based file on the known shared file server, containing a list of available projects and information necessary to establish a connection to a particular server program. Once the client 102 has located a server program, the client program can create a network connection between the two computers using standard protocols, such as, e.g., the transmission control point/Internet Protocol (TCP/IP) protocols. The connection can remain open for some period of time, and all communications between client and server can be made through the connection. If, for some reason, the connection is broken, the client program can automatically attempt to reconnect to the server program.

In addition, if a plurality of projects are resident on one or more of the application servers 112a, 112b shown in FIG. 1, but only a subset of those projects are "active" at a time, then a third program may run on those application servers 112a, 112b called a server instigator program. The role of the server instigator program can be to receive requests from a client program for a server program for any given project, and can return the location of that server program if it is already active. Otherwise, the server instigator program can activate the server program and can then return its location to the requesting client program.

In a preferred embodiment of the present invention, the system can be implemented using the viecon.com project database available from Bentley, Inc. of Exton, Pa., U.S.A. It can be readily appreciated that the true power of the ECO CAD application is in the sum of its parts. It can provide an integrated, comprehensive offering of project-oriented browser based collaboration tools and technology to help a user succeed in a user's projects, now further enabled to support populating the viecon database with spatial data associated with businesses, projects and people. For members, various tools may be licensed, e.g., on a per-user, per-project or per-month basis. Using Viecon Platforms, users can deploy similar functionality in their organization and integrate it with their existing back office systems such as EDM, ERP or EIM applications.

The ECO CAD application can also provide project extranet resources, which can allow the user to: (1) store, share, synchronize and secure content (e.g., documents; models; drawings (DGN, DWG, DXF, IGES, ACIS, SAT, CGM, GRD); specifications; photos; animations; renderings; and sound); (2) collaborate through online meetings or sharing applications; (3) communicate by way of threaded discussions, forms, and E-mail; (4) manage (i.e., everything has an activity log and, thereby, facilitates automatic version control, project calendar and scheduling, task management, team directories, full access control, and secure sockets layer (SSL) encryption); (5) put the project in its proper context by including news, weather, maps, services, and support; (6) utilize industry links to materials, professional organizations, and industry publications; and (7) view data geospatially on a map visually illustrating geographically project-oriented data. In short, the ECO CAD application can offer powerful applications for content, communication and collaboration in a secure, hosted environment.

Referring again to FIGS. 1B and 7, it can be seen that the ECO CAD application can include a electronic plot module, an interchange translation module, and a review module.

The Plot module can provide a means of viewing drawings over the Internet. Integrated with any MAPI compliant E-mail system, such as Microsoft Exchange, the plot module can allow users to E-mail electronic plots to members of the user's extended work team, such as customers and suppliers who do not have access to MicroStation or AutoCAD. The interchange module can enable CAD administrators in charge of a workgroup's project data to manage various file formats. Interchange can simplify the process of maintaining synchronized design data by automating the conversion of between files of different formats. The review module can enable simple, accurate, standalone viewing by project reviewers. Team members who require design review capabilities can do so without altering design data and without purchasing additional software licenses. A user can extend the use of live engineering project drawings and models throughout the enterprise without affecting the user's bottom line. Moreover, team members can use this viewing tool for the entire life of the project.

A user of the plot module merely defines the plot area using a view or fence. Then, the user can compose a recipient list using Internet E-mail addresses, local mailing lists, or a combination of both. A short note may then be added to the E-mail. Finally, the user can send the eplot to a recipient as illustrated in FIG. 7. A plot publisher contained within the plot module can automatically create a compact viewable electronic plot file, which can then be sent to one of the application servers 112a, 112b. At the same time, the plot module can also send out an E-mail message to everyone on the user's recipient list. This E-mail can inform the recipients that they have received a Eplot, and can provide the recipients with the Internet location (URL) where the eplot can be viewed. There are no complex plug-ins or viewers to install. The recipient simply clicks on the link in his/her E-mail, automatically connecting to the plot module in the browser using a compact yet powerful Java viewer.

Using a viewer portion of the plot module, users can accurately measure distances, zoom in and out on various areas of the design without degradation of detail and change level or layer settings. A publishing client of the plot module, in an exemplary embodiment of the present invention, can include: (1) MicroStation/J V07.00.01.11 or later; (2) Internet Explorer V4 or later; and (3) for address book support, a MAPI complaint E-mail system is required. Otherwise, if no MAPI complaint E-mail system is present, the publisher can be limited to using Internet E-mail addresses. A viewing client of plot module can include: (1) Internet Explorer V4 or later; or (2) Netscape Navigator V4.08 or later. Further details regarding the plot module 205 can be found in U.S. Ser. No. 09/586,786, filed concurrently herewith, for a "System, Method and Computer Program Product for Generating a Viewable Computer Aided Design (CAD) Eplot".

CAD administrators in charge of a workgroup's project data often deal with various file formats. The interchange module can simplify the process of maintaining synchronized design data by automating the conversion of between files of different formats. Interchange can run in the background and can search a specified source folder/directory and its subfolders/subdirectories for input in one format (e.g., MicroStation design files) and can convert any designs updated since the last time the interchange module checked to a different format file (e.g., AutoCAD) in a target folder/directory. The interchange module can compare the date and time of all of the source files against their corresponding destination counterparts. A database can be continually maintained in the disk arrays of SAN 114 with information on source files and their dependencies, such as MicroStation BASIC settings files used for data conversion, attached reference files, etc. It can automatically create a new destination file when either the source file or one of its dependencies is changed. Source files that are already synchronized with their respective destination file are left alone.

In an exemplary embodiment of the invention, the interchange module can support the following combinations of design data: (1) DGN to DWG; (2) DGN to DXF; (3) DWG to DGN; (4) and DXF to DGN. Interchange is a standalone utility. That is, downloading and installation on a host computer is required. Further details regarding the interchange module can be found in U.S. Ser. No. 09/586,786, filed concurrently herewith, for a "System and Method to Maintain Real-Time Synchronization of Data In Different Formats".

The review module can provide the following functions: (1) complete and accurate access to 2-D and 3-D designs for 100 percent graphical binary compatibility with other various engineering products; (2) independent, resizable, always-active views; (3) support of existing workspaces; (4) AutoCAD DWG support, including AutoCAD 2000; (5) zoom; (6) pan; (7) print; (8) level/layer control; (9) QuickVision GL real time rendering; (10) fly through 3-D models; (11) redlining; and (12) "Save as" DWG/DGN conversion. It is available in either of two versions: (1) targeted functionality in an easy, efficient download; and (2) comprehensive functionality, in a full-function download. Further details regarding the operation of the review module can be found in viecon.Review User's Guide, publication currently available from Bentley Systems, Inc., which is incorporated herein by reference in its entirety.

As noted herein above, the ECO CAD application according to the present invention is component-based. In the preferred embodiment of this invention, the component-based ECO CAD application is configured according to an XML schema.

Basic use of the ECO CAD application is now described. If the user is a user, the site appears differently than if the user is a project administrator. No matter who the user is, the site is constructed to lead the user through the process of establishing and maintaining a project as quickly and easily as possible. At each step, tools are provided to ensure that all interested parties are kept informed of all communications, both verbal and graphic. Even people outside the immediate project list can be kept informed with tools that allow the user to send design information over the Web to users without CAD tools or related experience.

With centralized drawing storage and off-site record keeping, complex projects take up little local disk space. And because projects are stored off-site, the user gets protection from local network outages and an assured backup scheme. All users have constant access to the most current data, all the time.

By entering basic contact information, project team members obtain first-level access to the site. This information can include geospatial location information such as the address of the team member. This gateway is also the first level of security, so that access to a user's proprietary design data is limited to only those users who are authorized to see the data. Following the registration process, the user is given an assigned passwords and other permissions that can provide unique project-level identification and grant the user access to the suite of tools on the site.

Once logged in, the user can be presented with a calendar-based page that can allow the user to view all of the current activities in which the user is involved. Listed on the Personal Space calendar page can be: (1) milestones; (2) documents; (3) tasks; (4) interactive collaboration tools; (5) administrative tools; (6) other tools; (7) security and data integrity; (8) weather and news. A key to productivity can be ensuring that all project members are aware of overall project status, and the key dates for all tasks and subprojects. By tracking project status, the user can achieve substantial cost savings by avoiding (and planning around) any potential conflicts and better control all schedule-driven activities. For example, site deliveries can be scheduled so that there is physical space for the loads and there are no on-site traffic jams. Further, if the interior studs have not yet been placed, then it may be too early for the electrical and plumbing contractors to begin work. Documents can include, e.g.: (1) CAD files; (2) text; (3) audio; and (4) video. Other images can be quickly added to a project. Even entire directory trees can be dragged and dropped. Once entered, the images or directories can fall under the ECO CAD application version control system for check out/in.

The user's personal space can allow the user to: (1) personalize the user's Project Space in order to track a project's progress and communicate with others. It can also be used to alter the look and feel of the user's space to suit the way the user works while still adhering to the guidelines established by the project. The personal space can also permit the user to view document history i.e., go back in time to see when and how decisions were made. Furthermore, the personal space can permit the user to track activity. The user can check on the progress of others, with at-a-glance status allowing the user to spot and react to potential schedule creep, before critical path time lines are affected. Personal space also permits the user to propagate information. Data is instantly distributed to all affected members on a project.

The user can also manage the user's project list, to minimize redundancy and reduce the information flow where necessary with custom-defined task and human resource lists. Additionally, the user can control access, such that restricted information is just that. Detailed, proprietary cost information can thus be made accessible only to the specified level of management users. The user can quickly see what documents changed since the user last viewed the site. Any change flagged as New could be a change in status, an additional posting to a Discussion Group, a revised drawing, or a new group member. Tools can send E-mail based on user-defined triggers. Users can elect (or be elected) to receive notification based on event occurrences. Triggers can include, e.g., milestones, calendar dates, new drawings, updated drawings, status changes, added documents, deleted documents, online meetings, Webex meetings, projects or sub-projects that have reached completion, missed deadlines and members removed (job change, transfer, leave). As not all events require an immediate response, a user can also tailor the notice to match the importance of the event. A user can also maintain the user's schedule through schedule module, which can provide a suite of tools to establish and publish project timelines, due dates, and parallel and concurrent tasks. The user can also estimate project completion time by summing the serial tasks, establish serial tasks, and establish task sequence.

All of the Document Tools can be designed to provide a continuous flow of information. The user can post projects by adding information, attaching drawings, starting discussions, or adding milestones. The project posts can be available at both the Project and User level. The user can also view project data. Users without CAD system access and experience can view and review the CAD data. Redlining tools can focus discussion on the precise areas of concern; for example, does this duct pass through a wall? Will the electrical conduits fit in the given space? The user can also use text-based tools, because threaded discussions can provide a continuous stream of information in a purely interactive model.

A user can also conduct online meetings with Webex. When static drawings are not enough, a user can meet on the Web and can save on transportation costs. Webex can allow users to share out their terminal so that all participants, across the country or around the world can instantly see the same image. All the while and at the same time, the telephone access can allow participants to freely share their thoughts and concerns. A user can participate in discussion groups by way of the discussions module. All project members can share and update discussions on all current project issues. This forum can also support a full range of listing and searching options, so the user can easily determine who said what and when. Finally, the user can access a project directory to search the list of project members and see who is attached to what project, what their contact information is, what business group they belong to, and more.

Other tools are available to the user. For example, a powerful search engine can be provided which allows the user to quickly locate any document or keyword. Other search options allow the user to specify documents by project, status, and other time-dependent parameters. Project navigation tools provide a common tool frame which allows the user to insert, delete, update, link, and modify projects. A forms designer provided through forms module can permit the user to quickly and easily create custom forms. To speed the process, the user can begin with an existing form and then build from there by adding, modifying, or removing fields.

Context-sensitive HTML help can also provide fast assistance. Project members can have access to a complete suite of downloadable tools for viewing and sending drawings, including, e.g.: (1) a DGN/DWG translation utility; (2) a tool to create digital virtual plots sent via E-mail; and (3) a read-only tool with redlining capability.

The ECO CAD application can also facilitate multi-level access control. The user's data is safe because site access is controlled on several levels. SSL and password protections can ensure that only authorized parties enter the site. Individual privileges for read-only, read-write can be provided in a particular Project area. Read-write privileges for the entire project can be strictly controlled and easily administered. Multi-level access control can also provide controlled downloads. While downloads are freely available to site members, each tool can require licensing.

Various modifications of the methods and systems disclosed herein above are possible without departing from the true spirit and scope of the present invention. It should be understood, therefore, that within the scope of the following claims, the present invention may be practiced otherwise than as has been specifically described in the foregoing embodiments.

What is claimed is:

1. An online system for providing engineering, construction, and operations (ECO) computer-aided design application services, comprising:
    a computer network, including server means and a plurality of clients each of which is connected to said server means over said network;
    means for operating said server means and said plurality of clients, said operating means supporting a runtime environment for the ECO application on said network;
    graphical user interface means displayed on said plurality of clients, said graphical user interface means including a plurality of personalized spaces;
    a database storing a plurality of files, including engineering documents and drawings, with a plurality of different file formats;
    a plurality of collaborative modules, each of which is run over said network, said collaborative modules including:
    means for accessing said engineering documents and drawings; and
    means for managing an engineering document; and
    means for viewing geospatially, according to geospatial attributes, ECO project textual data including at least one of a business, a project, a task, a document, or a person.

2. The system according to claim 1, further comprising:
    means for translating drawings of one of said plurality of file formats to another of said plurality of file formats;
    means for mirroring said database drawings of said one of said plurality of file formats with said other of said plurality of file formats; and
    means for sharing translation settings used by said translating means.

3. The system according to claim 1, wherein said server means comprises:
    a plurality of web servers;
    a plurality of application servers, each of which is connected to said plurality of web servers;
    a file server connected between said database and each of said plurality of application servers; and
    a database server connected between said database and each of said plurality of application servers.

4. The system according to claim 3, further comprising means for clustering said file server and said database server.

5. The system according to claim 1, wherein each of said plurality of files is stored in said database as a series of components.

6. The system according to claim 5, wherein each said series of components includes an element defining a unique identification.

7. The system according to claim 6, wherein said series of components further define a plurality of objects.

8. The system according to claim 7, further comprising a state server connected to each of said plurality of application servers, wherein said state server is adapted to maintain a state of an instance of each of said plurality of objects.

9. The system according to claim 1, further comprising:
    means for composing a view of an engineering drawing and any data embedded therein;
    means for listing a plurality of intended recipients of said view;
    means for plotting said view into a file;
    means for storing said plotted file as a universal resource locator on a Web-based server;
    means for transmitting a message to each of said plurality of intended recipients, said message including a link to said universal source locator;
    means for modifying said file and create a new version thereof which is capable of executing automatically upon download; and
    means for downloading said new version of said file to each of said plurality of intended recipients selecting said link, whereby said new version of said file executes and enables said view to be viewed.

10. The system according to claim 1, further comprising means for modifying the geospatial attributes.

11. A method of providing application services for an engineering, construction, and operations (ECO) application, comprising the steps of:
    providing a computer network, including one or more servers, each of which is accessed by a plurality of clients over said network;
    providing means for operating said one or more servers, which supports a runtime environment for the ECO application on said network;
    providing a graphical user interface which is displayed on said plurality of clients, said graphical user interface including a plurality of personalized spaces;
    providing a database for storing a plurality of files, including engineering documents and drawings, with a plurality of different file formats, each of said plurality of files being stored in said database as a series of components;
    providing a plurality of collaborative modules, each of which is run over said network, said collaborative modules including:
    means for accessing said engineering documents and drawings; and
    means for managing an engineering document;
    controlling access to the ECO application such that only those clients authorized to use the ECO application for a given project are permitted access to said project; and
    means for viewing geospatially, according to geospatial attributes, ECO project textual data including at least one of a business, a project, a task, a document, and/or a person.

12. The method according claim 11, further comprising the step of adapting said collaborative modules for use by a thin client.

13. The method according to claim 11, further comprising the step of adapting said collaborative modules for use by a fat client.

14. The method according to claim 11, further comprising the step of adapting said collaborative modules for use by a thin client and a fat client.

15. A non-transitory computer-readable medium storing computer readable program code for causing a computer to perform the steps of:
    providing a graphical user interface to a database storing a plurality of files, including engineering documents and drawings, with a plurality of different file formats, each of said plurality of files being stored as a series of components;
    accessing said engineering documents and drawings;
    managing an engineering document;
    managing a discussion;
    managing a form;
    managing time; and viewing geospatially, according to geospatial attributes, engineering textual data including at least one of a business, a project, a task, a document, and/or a person.

16. The computer-readable medium according to claim 15, wherein said providing the graphical user interface comprises:
- providing a first personalized space adapted to be personalized for a specific user;
- providing a second personalized space adapted to be personalized for a specific business; and
- providing a third personalized space adapted to be personalized for a specific project.

17. The computer-readable medium according to claim 15, comprising:
- translating drawings of one of said plurality of file formats to another of said plurality of file formats;
- mirroring said database drawings of said one of said plurality of file formats with said other of said plurality of file formats; and
- sharing translation settings used by said translating means.

18. The computer-readable medium according to claim 15, further comprising:
- composing a view of an engineering drawing and any data embedded therein;
- listing a plurality of intended recipients of said view;
- plotting said view into a file;
- storing said plotted file as a universal source locator on a Web-based server;
- transmitting a message to each of said plurality of intended recipients, said message including a link to said universal source locator;
- modifying said file and create a new version thereof which is capable of executing automatically upon download; and
- downloading said new version of said file to each of said plurality intended recipients selecting said link, whereby said new version of said file auto-executes enabling said view to be viewed.

19. The computer-readable medium according to claim 15, wherein said managing time further comprises:
- rendering a calendar of events;
- scheduling an event; and
- managing a workflow within a project including said engineering documents and drawings.

* * * * *